(12) United States Patent
Zheng

(10) Patent No.: US 9,223,657 B2
(45) Date of Patent: Dec. 29, 2015

(54) SELF-RESCUE METHOD AND DEVICE FOR DAMAGED FILE SYSTEM

(75) Inventor: Xin Zheng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 184 days.

(21) Appl. No.: 13/806,870

(22) PCT Filed: Nov. 16, 2010

(86) PCT No.: PCT/CN2010/078789
§ 371 (c)(1),
(2), (4) Date: Dec. 26, 2012

(87) PCT Pub. No.: WO2012/000272
PCT Pub. Date: Jan. 5, 2012

(65) Prior Publication Data
US 2013/0103981 A1 Apr. 25, 2013

(30) Foreign Application Priority Data
Jun. 29, 2010 (CN) .......................... 2010 1 0212601

(51) Int. Cl.
*G06F 11/00* (2006.01)
*G06F 11/14* (2006.01)

(52) U.S. Cl.
CPC ........ *G06F 11/1412* (2013.01); *G06F 11/1417* (2013.01)

(58) Field of Classification Search
USPC .......................................................... 714/36
See application file for complete search history.

(56) References Cited

U.S. PATENT DOCUMENTS

| 6,185,678 B1 * | 2/2001 | Arbaugh et al. ................ 713/2 |
| 6,928,579 B2 | 8/2005 | Aija |

(Continued)

FOREIGN PATENT DOCUMENTS

| CA | 2424508 A1 | 10/2003 |
| CN | 1811707 A | 8/2006 |

(Continued)

OTHER PUBLICATIONS

Supplementary European Search Report in European application No. 10853975.0, mailed on Dec. 5, 2013. (8 pages—see entire document).

(Continued)

*Primary Examiner* — Kamini Patel
(74) *Attorney, Agent, or Firm* — Oppedahl Patent Law Firm LLC

(57) ABSTRACT

The present application discloses a self-rescue method and device for a damaged file system. The method includes: a fault warning message is sent to a background server when it is found during boot of a device that a file system is damaged; the device receives an acknowledgement message from the background server, wherein the acknowledgement message contains a path and file name of a backup version selected by the background server according to a product type; and the device downloads a version file and reboots from the version file. The device, when finding during the boot that the file system is damaged, implements network communications between the foreground and the background prior to switching to a large version, in order to acquire a version from the background server actively and reload it, so that the damaged file system is self-repaired automatically without manual interference.

4 Claims, 2 Drawing Sheets

(56) References Cited

U.S. PATENT DOCUMENTS

| | | | |
|---|---|---|---|
| 7,640,458 B2 * | 12/2009 | Rao et al. | 714/38.14 |
| 7,849,454 B2 * | 12/2010 | Lambert et al. | 717/168 |
| 8,719,390 B2 * | 5/2014 | Hyoudou et al. | 709/222 |
| 2002/0147941 A1 | 10/2002 | Gentile | |
| 2003/0005037 A1 | 1/2003 | Aija | |
| 2003/0204792 A1 * | 10/2003 | Cahill et al. | 714/55 |
| 2004/0098426 A1 * | 5/2004 | Ishii et al. | 707/204 |
| 2005/0223374 A1 | 10/2005 | Wishart et al. | |
| 2006/0145133 A1 | 7/2006 | Komarla et al. | |
| 2006/0156140 A1 * | 7/2006 | Van Haegendoren et al. | 714/741 |
| 2006/0190773 A1 * | 8/2006 | Rao et al. | 714/38 |
| 2007/0169088 A1 * | 7/2007 | Lambert et al. | 717/168 |
| 2007/0174704 A1 * | 7/2007 | Shih | 714/36 |
| 2012/0011236 A1 * | 1/2012 | Hyoudou et al. | 709/222 |

FOREIGN PATENT DOCUMENTS

| | | |
|---|---|---|
| CN | 101582044 A | 11/2009 |
| EP | 1271322 A2 | 1/2003 |
| JP | 2002147941 A | 5/2002 |
| JP | 2005530264 A | 10/2005 |
| JP | 2009514042 A | 4/2009 |
| JP | 2009266205 A | 11/2009 |
| JP | 2010044759 A | 2/2010 |
| JP | 2010061419 A | 3/2010 |
| WO | 2009038337 A2 | 3/2009 |

OTHER PUBLICATIONS

International Search Report in international application No. PCT/CN2010/078789, mailed on Mar. 31, 2011.

English Translation of the Written Opinion of the International Search Authority in international application No. PCT/CN2010/078789, mailed on Mar. 31, 2011.

\* cited by examiner

SELF-RESCUE METHOD AND DEVICE FOR DAMAGED FILE SYSTEM

TECHNICAL FIELD

The disclosure relates to the field of network management, in particular to a self-rescue method and device for a damaged file system.

BACKGROUND

The file system is a method and a data structure for specifying a file on a disk or a partition in an operating system context, i.e., a method for organizing files on the disk. The file system also refers to the disk or partition for storing files, or refers to a file system type. The file system is short for the file management system, referring to a software organization responsible for the management and storage of file information in the operating system, and consisting of the three following parts: software related to the file management, managed files and data structure needed for the file management. From the standpoint of the system, the file system is a system for organizing and allocating the file storage space, and responsible for the storage of the file and the protection and retrieval of the stored files. Specifically, it is responsible for creating, saving, reading, modifying and dumping a file and controlling the file access for a user, and canceling the file which is not used by the user any more. Furthermore, storage media are maintained by the file system, so that the utilization frequency of each area of the storage media is balanced and the service life of the storage media is effectively prolonged.

Except the electronic products which only serve as a storage device, large base station equipment as well as a small computer and mobile phone all adopt different file system technologies. For example, in the VxWorks operating system which utilizes the same file system (dosFs) as the DOS, the file system is established on a block device. Under the vxWorks I/O system, the True Flash File System (TFFS) is a program module for driving the block device and provides a unified block device interface for various storage devices, and furthermore, it is characterized by reenterability and thread security, and supports most of popular Central Processing Unit (CPU) architectures. With the file system management, the application reads and writes the FLASH storage device as if it operates a disk device which has an MS-DOS file system.

Since the file system management is executed by a pure software algorithm, there is a common problem in the industry at present, that is, file system crash caused by abnormal power failure, which shows that the cluster table information of a management file is damaged to lead to the non-identification of file management information, so that no file can be found, and the file system has to be formatted to re-create the cluster table information, and accordingly, all the files are removed and the version file is also lost. Therefore, the manufactures have to repair the products.

At present, a common method is to store the version file and the important information files to a private data area of a non-file system part, however, because the method is based on a large storage device space, for many electronic products with small-capacity storage media, the method may greatly reduce the use space of the file management part of the storage space and shorten the service life of the storage media.

SUMMARY

The main technical problem to be solved by the disclosure is to provide a self-rescue method and device for a damaged file system, to implement the self-repair of the damaged file system.

To solve the technical problem, the disclosure provides a self-rescue method for the damaged file system, including:
a fault warning message is sent to a background server when it is found during boot of a device that a file system is damaged;
the device receives an acknowledgement message from the background server, wherein the acknowledgement message contains a path and file name of a backup version selected by the background server according to a product type; and
the device downloads a version file and reboots from the version file.

Furthermore, the method may include: an address capable of ensuring communications between a foreground server and the background server is backed up to a private data area of a non-file system, when the device is powered on for the first time.

Furthermore, the method may include: the address needed for the communications with the background server is acquired from the private data area of the non-file system, before the fault warning message is sent to the background server.

Furthermore, the method may include: BOOT enters an exception handling branch and records an exception branch identifier, before the fault warning message is sent to the background server when it is found during boot of the device that the file system is damaged.

Furthermore, after the device reboots from the version file, the device may determine whether the exception branch identifier recorded by BOOT is valid, if so, it may read the backup address to restore register.

Furthermore, the version file may be downloaded via File Transfer Protocol (FTP) or Hyper Text Transfer Protocol (HTTP); and
the device may send the fault warning message to the background server via User Datagram Protocol (UDP) or Simple Network Management Protocol (SNMP).

The disclosure further provides a self-rescue device for the damaged file system, including a sending and receiving module, a downloading module and a boot module, wherein
the sending and receiving module is configured to send a fault warning message to a background server when it is found during boot of a device that a file system is damaged, and to receive an acknowledgment message from the background server, wherein the acknowledgment message contains a path and file name of a backup version selected by the background server according to a product type;
the downloading module is connected with the sending and receiving module and is configured to download a version file from the background server; and
the boot module is connected with the downloading module and is configured to reboot from the version file after the downloading is completed.

Furthermore, the sending and receiving module may be configured to back up an address capable of ensuring communications between a foreground server and the background server to a private data area of a non-file system, and to acquire the address needed for the communications with the background server from the private area of the non-file system.

Furthermore, the device may include a control module, which is configured to control the device to enter an exception handling branch and record an exception branch identifier when it is found during boot of the device that the file system is damaged.

Furthermore, the control module may be configured to, after the device reboots from the version file, determine whether the recorded exception branch identifier is valid, and read the backup address to restore register in the case that the identifier is valid.

Furthermore, the downloading module may be configured to download the version file from the background server via FTP or HTTP; and the sending and receiving module may be configured to send the fault warning message to the background server via UDP or SNMP.

The disclosure has the following advantages: compared with the relevant art, the device, when finding during the boot that the file system is damaged, implements network communications between the foreground and the background prior to switching to a large version, in order to acquire a version from the background server actively and reload it, so that the damaged file system is self-repaired automatically without manual interference.

DETAILED DESCRIPTION

The disclosure is further explained below through specific embodiments in combination with the accompanying drawings.

Figure 1:
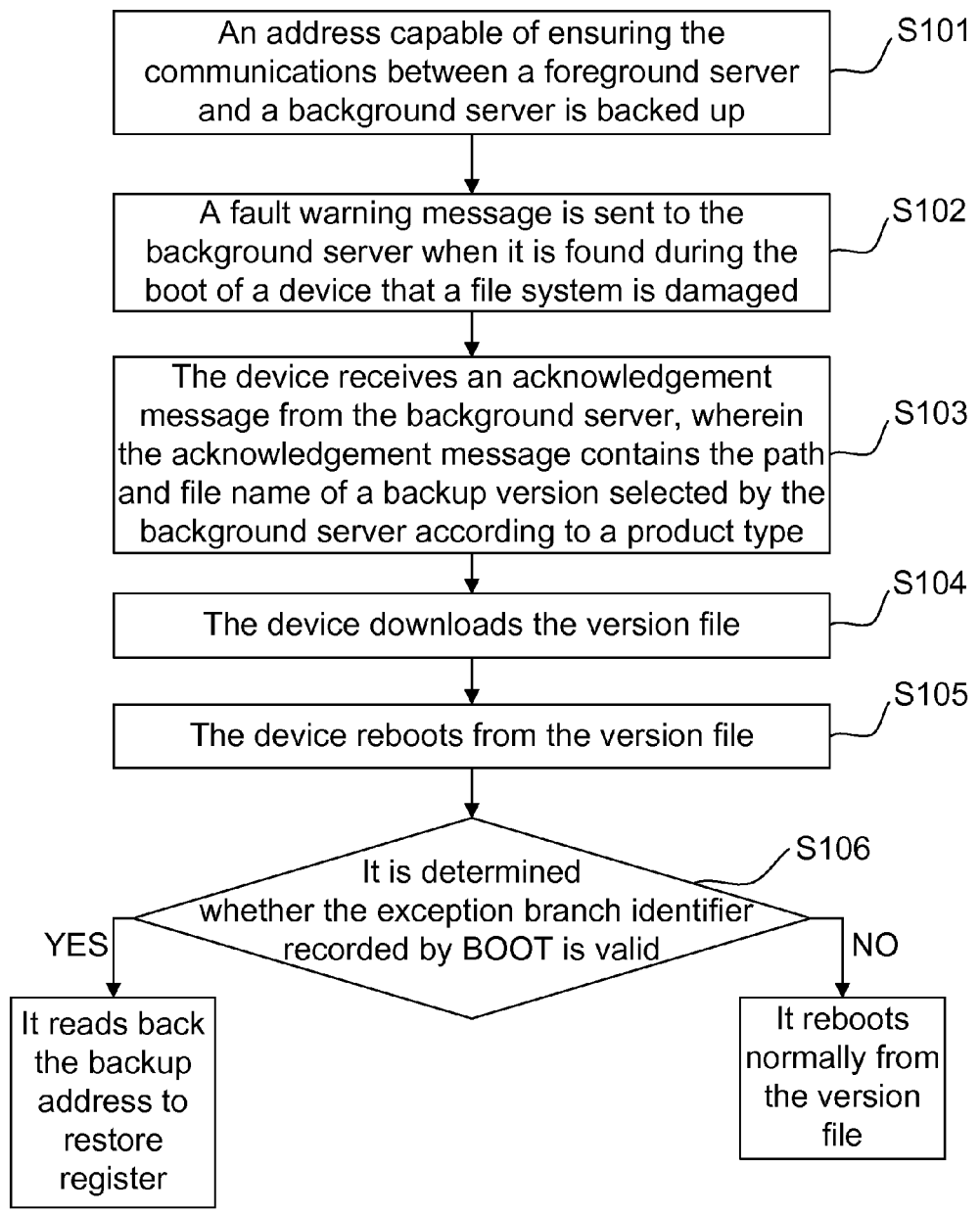
FIG. 1 is a flowchart of a self-rescue method for a damaged file system provided by the disclosure.

As shown in FIG. 1, a self-rescue method for a damaged file system includes the following steps.

S101: an address capable of ensuring the communications between a foreground server and a background server is backed up.

After a single board is powered on for the first time, the address capable of ensuring the communications between the foreground server and the background server is backed up at a private data area of a non-file system, thereby being not damaged due to the damaged file system. The backup parameters at the private data area are updated in real time each time the key parameter contents above are modified.

S102: a fault warning message is sent to the background server when it is found during the boot of a device that a file system is damaged.

The self-test is performed first during the boot of the device, and BOOT enters an exception handling branch once it is found that a file system is damaged or a version file or a backup version file is damaged.

Specifically, first, BOOT records an exception branch identifier; and then, sends the fault warning message to the background server via UDP or SNMP.

Before the fault warning message is sent to the background server, it is necessary to acquire an address needed for the communications with the background server from the private data area of the non-file system.

S103: the device receives an acknowledgement message from the background server, wherein the acknowledgement message contains the path and file name of a backup version selected by the background server according to a product type.

After receiving the fault warning message, the background server selects a proper backup version according to the product type contained in the message and returns the acknowledgement message to the failed device, wherein the acknowledgement message contains the path and file name of the version.

S104: the device downloads the version file.

After receiving the acknowledgment message, BOOT enters a version downloading mode, and downloads a version file remotely via FTP or HTTP.

S105: after completing downloading, the device reboots from the version file.

S106: after being powered on again, the device determines whether the exception branch identifier recorded by BOOT is valid, if so, it reads back the backup address to restore register; and if not, it reboots normally from the version file.

Figure 2:
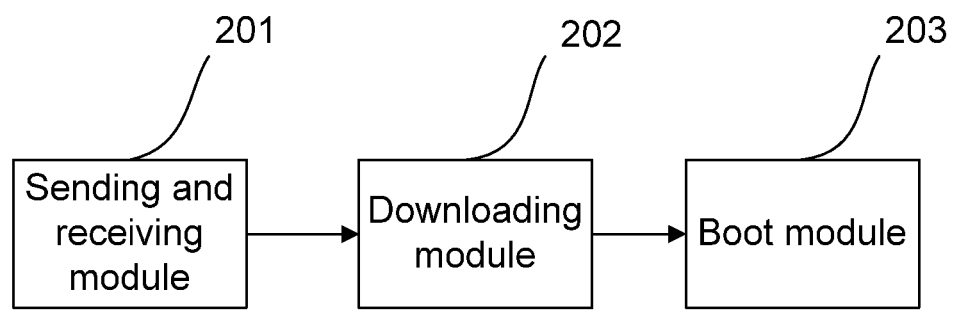
FIG. 2 is a block diagram of a device provided by the disclosure.

As shown in FIG. 2, a self-rescue device for the damaged file system includes a sending and receiving module 201, a downloading module 202 and a boot module 203.

The sending and receiving module 201 is configured to send a fault warning message to a background server when it is found during boot of a device that a file system is damaged, and to receive an acknowledgment message from the background server, wherein the acknowledgment message contains a path and file name of a proper backup version selected by the background server according to a product type.

Furthermore, in the embodiment, the sending and receiving module 201 is further configured to back up an address capable of ensuring the communications between the foreground server and the background server to a private data area of a non-file system, so that the address will not be damaged due to the damaged file system, thus improving the reliability of the device. The backup address parameters at the private data area are updated in real time each time the address is modified. When the file system of the device is damaged and communications with the background server are required, the address needed for the communications with the background server is acquired from the private data area of the non-file system. In the embodiment, the sending and receiving module 201 exchanges messages with the background server via UDP or SNMP, such as sending the fault warning message to the background server via UDP or SNMP.

The downloading module 202 is connected with the sending and receiving module 201 and is configured to download a version file from the background server. Specifically, the downloading module downloads the version file from the background server via FTP or HTTP.

The boot module 203 is connected with the downloading module 202 and is configured to reboot from the version file after the downloading is completed.

The self-rescue device further includes a control module, which is configured to control the device to enter an exception handling branch and record an exception branch identifier when it is found during boot of the device that the file system is damaged.

Furthermore, after the device reboots from the version file, the control module determines whether the recorded exception branch identifier is valid, if so, it reads back the backup address to restore register.

To sum up, a self-rescue means for a crashed file system provided by the embodiments of the disclosure does not pay attention to how to make the file system as less damaged as possible any more, but to enable the device to implement foreground and background network communications prior to switching to a large version when the device finds during the boot that the file system is damaged, in order to acquire a version from the background server actively and reload it, so that the damaged file system is self-repaired automatically without manual interference, and the reliability of the system is improved, and therefore, the self-rescue means is very significant to the stability and practicality of products.

The above are the further descriptions of the disclosure with reference to the specific embodiments, and it should not be considered that the specific embodiments of the disclosure are only limited to these descriptions. Various simple derivations or replacements can be made by those skilled in the art within the concept of the disclosure and pertain to the scope of protection of the disclosure.

The invention claimed is:

1. A self-rescue method for a damaged file system, comprising:

backing up an address capable of ensuring communications between a foreground server and a background server to a private data area of a non-file system of a device, when the device is powered on for the first time;

entering an exception handling branch, recording an exception branch identifier, and sending a fault warning message to the background server according to the address when it is found during boot of the device that a file system is damaged;

receiving, by the device, an acknowledgement message from the background server, wherein the acknowledgement message contains a path and file name of a backup version selected by the background server according to a product type; and downloading, by the device, a version file, and rebooting from the version file;

determining, by the device, the exception branch identifier is valid and reading, by the device, the address to restore register after the device reboots from the version file;

wherein the method further comprises: acquiring the address needed for the communications with the background server from the private data area of the non-file system, before the fault warning message is sent to the background server.

2. The method according to claim 1, wherein the version file is downloaded via File Transfer Protocol (FTP) or Hyper Text Transfer Protocol (HTTP); and the device sends the fault warning message to the background server via User Datagram Protocol (UDP) or Simple Network Management Protocol (SNMP).

3. A self-rescue device for a damaged file system, comprising a memory storing a program and one or more processors executing the stored program for implementing: a sending and receiving module, a downloading module, a boot module and a control module, wherein the sending and receiving module is configured to back up an address capable of ensuring communications between a foreground server and a background server to a private data area of a non-file system of a device when the device is powered on for the first time, to send a fault warning message to the background server according to the address when it is found during boot of the device that a file system is damaged, and to receive an acknowledgment message from the background server, wherein the acknowledgment message contains a path and file name of a backup version selected by the background server according to a product type;

the downloading module is connected with the sending and receiving module and is configured to download a version file from the background server;

the boot module is connected with the downloading module and is configured to reboot from the version file after the downloading is completed; and the control module is configured to control the device to enter an exception handling branch and record an exception branch identifier when it is found during boot of the device that the file system is damaged, and to determine the recorded exception branch identifier is valid and read the address to restore register after the device reboots from the version file;

wherein the sending and receiving module is further configured to acquire the address needed for the communications with the background server from the private area of the non-file system, before the fault warning message is sent to the background server.

4. The device according to claim 3, wherein the downloading module is configured to download the version file from the background server via FTP or HTTP; and the sending and receiving module is configured to send the fault warning message to the background server via UDP or SNMP.

* * * * *